Feb. 21, 1967 N. G. MUSKOVAC ETAL 3,305,739
PHASE SHIFTING APPARATUS FOR CONTROLLED PULSING
OF CONTROLLED RECTIFIERS
Filed Jan. 27, 1966
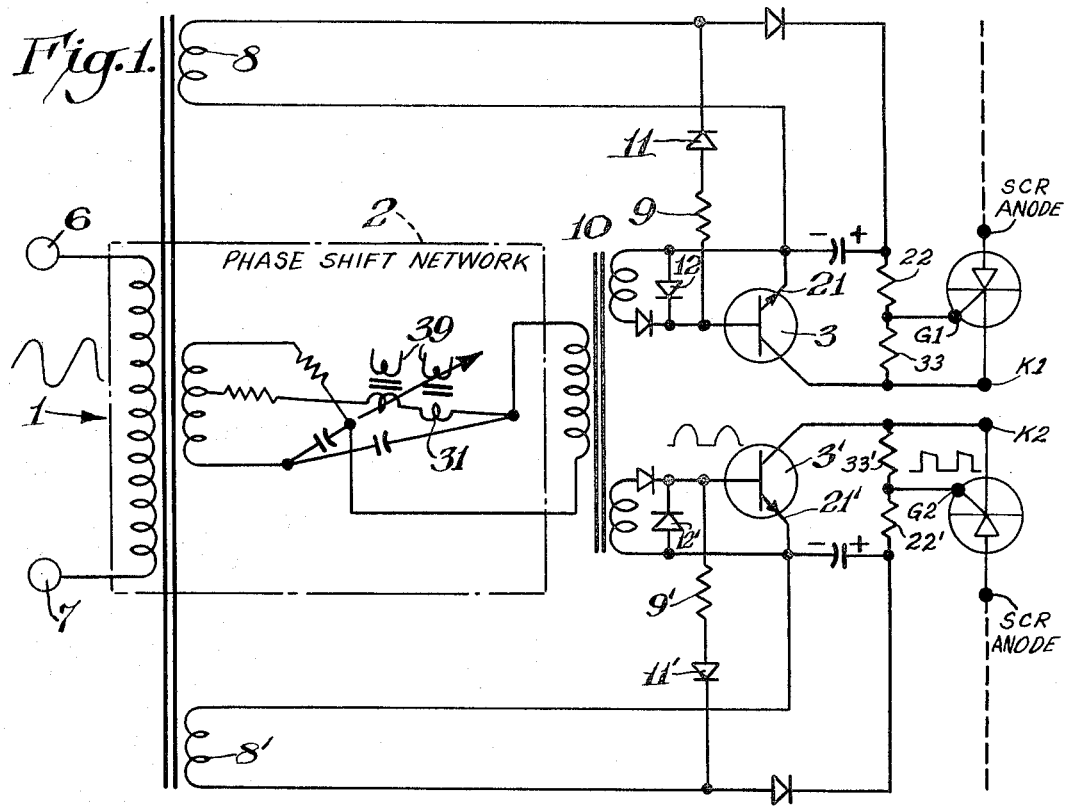
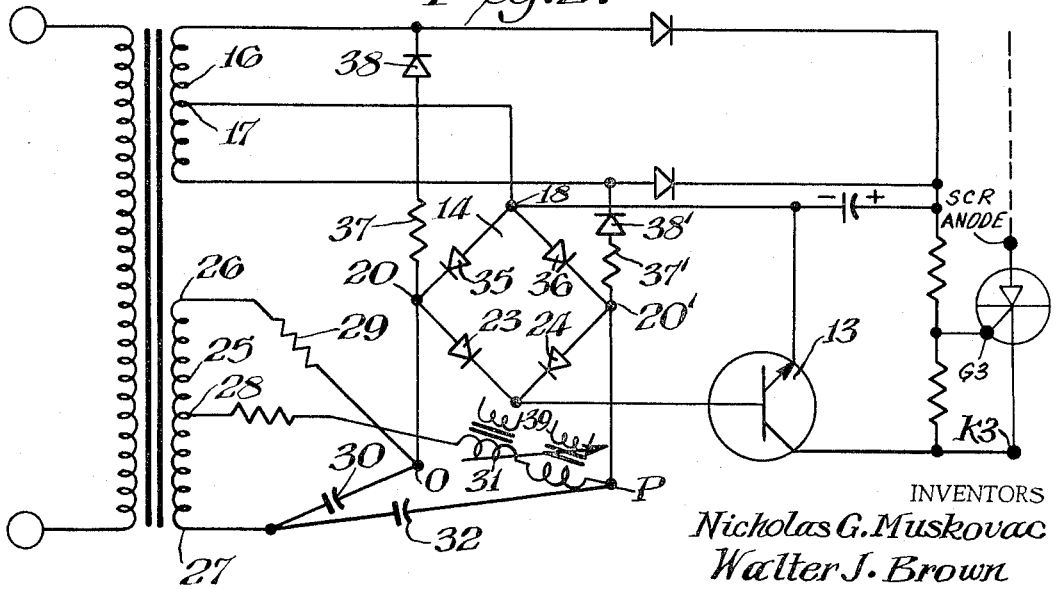
INVENTORS
*Nicholas G. Muskovac*
*Walter J. Brown*
BY *Connolly and Hutz*
ATTORNEYS

United States Patent Office 3,305,739
Patented Feb. 21, 1967

3,305,739
PHASE SHIFTING APPARATUS FOR CONTROLLED PULSING OF CONTROLLED RECTIFIERS
Nicholas G. Muskovac, Williamstown, Mass., and Walter J. Brown, Stamford, Conn., assignors to Sprague Electric Company, North Adams, Mass., a corporation of Massachusetts
Filed Jan. 27, 1966, Ser. No. 523,384
4 Claims. (Cl. 307—88.5)

This application is a continuation-in-part of our U.S. patent application Serial No. 241,431, filed November 30, 1962, now abandoned.

This invention relates to phase shifting control means for silicon controlled rectifiers (hereinafter called SCR) and more particularly to means for controlled pulsing of SCR's.

An SCR is a three terminal device having an anode, a cathode and a gate. One of its features is that it conducts current only when its anode is of a positive voltage with respect to its cathode. Control of current through the SCR may be obtained by applying a positive firing voltage and current to its gate. In U.S. patent application Serial No. 209,617, filed July 13, 1962, by Walter J. Brown there is disclosed apparatus for initiating conduction of an SCR, which apparatus employs a phase shifting control means for controlling the application of a positive firing voltage and current to the gate of the SCR. The disclosure of the aforementioned U.S. patent application Serial No. 209,617 is incorporated herein by reference.

The A.C. voltage supplied to an SCR conventionally has a negative portion as well as a positive portion. It is important to prevent reverse leakage through an SCR. It is also important to prevent the application of a gating pulse to an SCR other than at the time when a positive anode voltage is applied thereto.

The apparatus disclosed in the above-mentioned Serial No. 209,617 discloses a transistor which has a current which is delivered to the gate of the SCR in response to an output pulse from a phase shifting network. It is desirable to provide a control of this gate current flowing to a half-wave fired SCR during the period when the positive portion of the anode voltage is not applied to the SCR. It is important that this control be effective at all portions of the negative period of the anode voltage cycle, and that the control not develop excessive power dissipation. Thus it is desirable to suppress any signal from the phase shifter which occurs other than during the conductive half-cycle of the anode voltage source, such as, for example, when no control signal is applied to the phase shifter. This applies also to full-wave firing of an SCR wherein rectified positive voltage is applied to the anode during each half-cycle of the source.

It is an object of this invention to provide a means of blocking any phase shifter output which occurs other than during the conductive half-cycle of the source.

It is an object of this invention to provide a means for blocking any transistor conduction in response to phase shifter outputs 180° out of phase with the source.

It is a further object of this invention to provide a blocking voltage which has current limiting means and also protects the transistor.

These and other objects of this invention will become more apparent upon consideration of the following description taken together with the drawings in which:

FIGURE 1 is a schematic diagram of a control circuit for an SCR providing means for firing a pair of SCR's with a full wave; and FIGURE 2 is a schematic diagram of another embodiment of a control circuit of this invention for full wave firing of one SCR.

In general, this invention involves serially connecting a diode and a current limiting resistor between the output of a variable phase shifting network and an alternating voltage source, which is in phase with the SCR anode voltage, to block out any positive voltage applied to the transistor base from the output of the phase shifter at any time the anode is negative. The transistor is able to conduct, to give a gating pulse in response to a phase shifter output which occurs during the conductive half-cycle of the anode voltage source; but it is prevented from conducting in response to voltages from the phase shifter which occur during the nonconductive half-cycle of the anode voltage source. An additional voltage limiter diode between the base and the emitter limits the voltage on the transistor employed for firing of an SCR.

The phase shifter provides an output voltage of variable phase angle and the same wave form (sinusoidal) as the source. This is rectified to provide a positive pulse on the base of the transistor. However, this output is blocked so that the transistor does not produce a gating pulse for any phase angles, except during the positive anode voltage on the SCR. The network of the blocking diode and the current limiting resistor produces a negative pulsating current to suppress any positive phase shifter output during the nonconductive half-cycle of anode voltage.

In a more limited sense for half wave firing of an SCR, the blocking diode and current limiting resistor provide sufficient negative voltage and current during negative half-cycles of the anode source to suppress out of phase voltage from the phase shifter, while it provides substantially no negative voltage during positive half-cycles and does not suppress a phase shift output within the 180° phase angle during which the anode source is positive. Thus, except during the positive anode voltage interval, the transistor base can not receive a positive pulse from the phase shifter and therefore does not conduct to produce a gate pulse during this interval.

Full wave firing of a pair of SCR's is provided by a second transistor, a second SCR and another blocking means phased 180° from the first. In addition, full wave firing of one SCR, by means of one transistor, is provided by a rectifier bridge circuit connecting the phase shifter output to the base of the transistor with a blocking means connected from each side of the output to an alternating current source, and by providing rectified positive SCR anode pulses each half-cycle of the alternating source.

FIGURE 1 of this application shows this invention applied to an SCR control in which two transistors provide a full wave control to a pair of SCR's. The phase shifting control means comprising a saturable reactor 31 having a D.C. control winding 39 is employed. A transformer and power supply unit 1, a phase shifting network 2 and a pair of transistors 3, 3' are analogous to similar components in FIGURE 1 of the above-mentioned Serial No. 209,617. A.C. input terminals 6 and 7 provide the power. The SCR control is provided at the gate terminals G1 and G2. The cathode terminals K1 and K2 are for connection to the SCR cathodes. The gate terminals G1 and G2, the cathode terminals K1 and K2, and the A.C. supply and load are connected to the SCR's as shown in FIGURE 1 of U.S. Letters Patent 3,128,422, issued April 7, 1964, to Walter J. Brown.

The transformer 10 is analogous to transformer 110 of FIGURE 2 of the above-noted application Serial No. 209,617 and the variable inductive element 31 is analogous to reactor 8 of this figure, whereas windings 39 are similar to D.C. control windings 106. The inductance 31, and thus the phase shift of the network 2, is varied in response to the direct current signal imposed on these windings 39. Thus the output coupled to transformer 10, of the phase shifter 2, is substantially sinusoidal (same as the source) but shifted in phase with respect to the source, in response to the D.C. control current through windings 39. It should be noted, that the phase may be shifted more than 180° to provide control during a full half-cycle, and that with no D.C. signal on windings 39 the inductance of reactor 31 is such that a phase lag results which is 180° behind the positive half-cycle of the anode source. These outputs, not within the conductive half-cycle, must be blocked from the transistor in order to prevent undesirable out of phase gate signals to the SCR.

A control pulse from the phase shifting means is provided through each of the transistors 3, 3' from the transformer 10. The anode voltage source for the SCR's is shown in dotted lines. The blocking of 180° out of phase signals from the phase shifter is provided by a potential from transformer 8 and 8'. This potential is connected to the phase shifter output and the respective bases of transistors 3, 3' by current limiting resistors 9, 9' and blocking diodes 11, 11' and limiting diodes 12, 12'.

During negative half-cycles of source 1, current flows through diode 12, resistor 9, and diode 11 to provide a pulsating negative voltage to block, or buck, any positive output from the phase shifter 2 during this interval or, in other words, any phase shifter signal more than 180° out of phase with source 1. This provides a negative bias across this portion of the phase shifter output and across the base-emitter of transistor 3 during negative half-cycles, and a substantially zero voltage bias during positive half-cycles of source 1. Similarly, the blocking circuit of transistor 3' which includes resistor 9' and diode 11' operates in an identical manner but 180° out of phase to that of transistor 3.

Accordingly, the blocking means suppresses any signal from the phase shifter which is more than 180° out of phase and thus prevents any out of phase signals to the transistors and their respective SCR's. Thus the blocking means, in the circuit of FIGURE 1, produces a negative base-to-emitter bias in the respective transistor 3 or 3' during the application of negative anode voltage to their respective SCR's.

FIGURE 2 illustrates a circuit for applying full wave control to one SCR, not shown, through a single transistor 13 and a diode bridge 14. The bridge 14 is connected to the output terminals of a phase shift system analogous to that shown and described in FIGURES 2 and 5 of U.S. Letters Patent No. 2,524,761 issued October 10, 1950, to Walter J. Brown wherein terminals O and P of FIGURE 2 correspond to terminals O and P of our present FIGURE 2. Corresponding elements of the two phase shifting systems are indicated by the same reference numerals as follows: a variable inductance 31, a capacitance 32, a transformer winding 25, terminals 26, 27 and 28, and impedances 29 and 30. A pair of control windings 39, similar to those of FIGURE 1 of the present application, are also provided for control of the phase angle.

The signal from the phase shifting network is applied to terminals 20 and 20' of bridge 14, and then to the base of transistor 13 through either diodes 23 or 24. For example, during a first half-cycle of applied alternating voltage, current may flow from terminal 20' through diode 24 to the base of transistor 13, and through it to terminal 18. The circuit to the other side of the phase shift network, terminal 20, is completed by current flowing through diode 35. The path during the next half-cycle is through diodes 23 and 36. The resultant gate pulses, from the transistor 13 are applied to the gate and cathode terminals for the SCR, G3 and K3 respectively. It should be noted that positive full wave rectified voltage is applied to the emitter-collector of transistor 13 and to the cathode-anode of the SCR in this circuit.

Two blocking or clamping means, diodes 38, 38' and resistors 37, 37', connect each side of the bridge to the A.C. source. Thus a transformer 16 is center tapped at 17 which is connected in turn to terminal 18 on the bridge. One side of the transformer 16 is connected to terminal 20 and the other side to terminal 20' of the bridge. The bridge also has diodes 35 and 36 between the center point terminal 18 and the respective terminals 20 and 20'.

As will appear from an examination of the schematic diagram in FIGURE 2, current will flow through the upper half of the bridge 14 to whichever side of the transformer 16 has the lower potential and pass through the respective diode 35 or 36, a respective current limiting resistor 37 or 37' and the respective blocking diode 38 or 38'. This current flow serves to buck out, or block, a positive signal from the phase shift network if such signal voltage is applied to the respective diode 23 or 24 at the time that the respective blocking diode 38 or 38' is passing the bucking current through its respective current limiting resistor 37 or 37'.

Stated otherwise, any phase shifter output which is more than 180° out of phase is not impressed on the base of transistor 13 because the diodes 35, 36 of its respective loop is blocked off. Thus, transistor 13 and the SCR will fire only in response to signals less than 180° out of phase with the A.C. supply. Subsequently, when no signal is applied to the phase shift control (to variable inductor 31), transistor 13 and the SCR are shut off, since the phase shift output is more than 180° out of phase.

It will be understood that the above-described illustrations and embodiments are set forth for the purpose of describing this invention and are not intended to limit its scope. Various modifications will be readily apparent to those skilled in the art within the spirit of this invention which is limited only by the scope of the appended claims.

What is claimed is:

1. An apparatus for controlling the initiation of firing pulses to the gate of a controlled rectifier energized from an alternating current source, comprising at least one transistor having its emitter-collector circuit in connection to said gate, a first unidirectional current means connecting said transistor to said source and providing a pulsating forward emitter-collector bias thereon, a variable phase shifting means coupled to said source, said phase shifting means providing at the output thereof an alternating current of variable phase angle and a substantially sinusoidal wave form, a second unidirectional current means connecting said output to the base of said transistor and providing positive pulses thereto, and a blocking means comprising a diode and a current limiting resistor serially connecting said output to said source, said blocking means providing a pulsating voltage to block any phase shifter output which would otherwise occur during nonconductive half-cycles of anodization of said controlled rectifier.

2. An apparatus as claimed in claim 1 wherein said second unidirectional current means is a bridge network providing positive pulses from said phase shifter output to said transistor each half-cycle, and said blocking means is provided in connection to each side of said bridge.

3. An apparatus as claimed in claim 1 including another first unidirectional current means, another second unidirectional current means and another blocking means all being connected to a second transistor and said phase shifter in 180° phase relation to said one means to produce a firing pulse for a second controlled rectifier in 180° phase relation to said first firing pulse.

4. An apparatus as claimed in claim 1 including a voltage limiting diode connected across said phase shifter output, said diode limiting the voltage applied by said blocking means.

References Cited by the Examiner
UNITED STATES PATENTS
2,977,523   3/1961   Cockrell _ _ _ _ _ _ _ _ _ _ _ 307—88.5

ARTHUR GAUSS, *Primary Examiner.*

J. HEYMAN, *Assistant Examiner.*